United States Patent [19]

Fowler

[11] Patent Number: 4,503,621
[45] Date of Patent: Mar. 12, 1985

[54] SOLID STATE COMPASS

[75] Inventor: John T. Fowler, Marblehead, Mass.

[73] Assignee: The Laitram Corporation, New Orleans, La.

[21] Appl. No.: 447,778

[22] Filed: Dec. 8, 1982

[51] Int. Cl.³ ............................................. G01C 17/30
[52] U.S. Cl. ............................................................. 33/361
[58] Field of Search ........................... 33/356, 357, 361

[56] References Cited

U.S. PATENT DOCUMENTS

| 2,213,357 | 9/1940 | Barth | 33/361 |
| 2,671,275 | 3/1954 | Burns, Jr. | 33/361 |
| 2,984,783 | 5/1961 | Singer | 33/361 |
| 2,998,727 | 9/1961 | Baker | 33/361 |
| 3,696,518 | 10/1972 | Leat | 33/361 |
| 4,267,640 | 5/1981 | Wu | 33/361 |

FOREIGN PATENT DOCUMENTS 395716  1/1974  U.S.S.R. ................................. 33/361

Primary Examiner—Richard R. Stearns
Attorney, Agent, or Firm—Weingarten, Schurgin, Gagnebin & Hayes

[57] ABSTRACT

A solid state compass having a pair of flux gates orthogonally disposed on a gimballed platform and coupled by a single pair of conductors to an electronic subsystem which includes a current source for energizing the respective flux gates and a detection and control circuit to provide control of flux gate energization and to detect signals derived from each flux gate and from which compass heading is derived.

13 Claims, 7 Drawing Figures

SOLID STATE COMPASS

FIELD OF THE INVENTION

This invention relates to magnetic compasses, and more particularly to a solid state magnetic compass employing flux gates supported on a normally horizontal platform.

BACKGROUND OF THE INVENTION

Flux gate compasses are known and include a pair of coils wound about a saturable magnetic core. Two or more coils are provided in orthogonal disposition on a platform which is gimballed to remain in substantially horizontal orientation. The output signals derived from the coils are proportional to the sine and cosine, respectively, of the heading. The output signals can be represented by $K \sin \theta$ and $K \cos \theta$, where $\theta$ is the angle of the coil axis with respect to the horizontal component of the earth's magnetic field, that is, the heading; and $K$ is a parameter being measured, such as voltage, current, or frequency. In actual practice, the output signals are of the form $K \sin \theta + C_1$ and $K \cos \theta + C_2$, where $C_1$ and $C_2$ are error terms occasioned by changes or variations due to temperature, aging of system components, mismatch of component values, and the like. Conventionally, potentiometer adjustments are provided in an effort to maintain the terms $C_1$ and $C_2$ near zero. It is an object of this invention to provide a solid state compass in which the error terms are automatically cancelled.

It is also an object of this invention to provide a gimballed platform which is relatively small to increase the resonant frequency of the gimballed structure, thereby to improve overall compass performance, and also to provide a compass structure which can be readily miniaturized, as is desirable for many applications.

As a further object, the invention provides a single electronic subsystem which is multiplexed for use with each flux gate of the compass, with all power and signal communication being by way of a single pair of conductors.

SUMMARY OF THE INVENTION

In accordance with the invention, the solid state compass includes first and second flux gates disposed in orthogonal disposition to one another on a platform gimballed to maintain a substantially horizontal orientation. The flux gates are coupled via a single pair of conductors to an electronic subsystem which includes a current source for energizing the respective flux gates and a detection and control circuit operative to provide control of the energization of each flux gate coil and to detect signals derived from each coil from which compass heading is derived.

In preferred implementation, the gimballed platform containing the flux gates includes a pair of conductive bearings by which control signals and power are applied to the flux gates and by which flux gate signals are provided to the electronic detection circuitry. All power and signals are conveyed over a single pair of wires and coupled to the flux gates on the gimballed platform by way of the conductive bearings. Since no wires need be attached to the gimballed platform, the novel compass is capable of 360° pitch and roll without use of slip rings.

Each flux gate coil is energized sequentially with a signal of one polarity and opposite polarity in a cyclic manner to provide an output in which the error terms are effectively cancelled and an accurate output signal provided which is a true measure of compass heading without necessity of potentiometer or other circuit adjustment.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
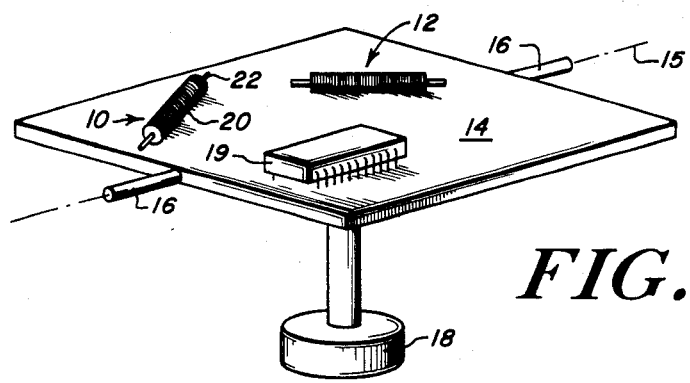
FIG. 1 is a pictorial view of the flux gates mounted on a normally horizontal platform.

The sensing assembly is shown in FIG. 1 and includes a first flux gate 10 and a second flux gate 12 which are supported on a platform 14 and which are in orthogonal disposition to one another. The platform 14 is pivotable about a pivot axis 15 via pivot pins or bearings 16, and is maintained in a normally horizontal orientation by action of a counterweight 18 supported below the plane of the platform. The flux gates 10 and 12 are thus maintained in normally horizontal orientation during operation. A second pair of bearings (not shown) is provided orthogonal to the bearings 16, all the bearings being part of a gimbal structure to allow the platform to remain horizontal in the presence of rolling and pitching motions. Each flux gate is composed of a cylindrical coil 20 having an opening therethrough in which is disposed a saturable core composed of a strip 22 of a saturable magnetic material such permalloy. The flux gates 10 and 12 have substantially identical electromagnetic characteristics to provide uniform performance when employed in the associated system. The flux gates 10 and 12 are arranged in the illustrated embodiment at 45° to the pivot axis to lie along diagonals of the platform 14, and thereby allow relatively longer coils for a given platform size. The longer coil length provides a greater length to diameter ratio and thus greater sensitivity for each flux gate. An integrated circuit 19 can be attached to the platform 14 and can contain control circuits for the coils 20.

The platform 14 is gimballed to remain substantially horizontal in the presence of rolling and pitching motions, and it is desirable to have the gimballed platform as small and light weight as possible to increase the resonant frequency of the gimballed structure and which will provide consequent reduction in the response of the gimballed structure to spurious oscillation. During rapid slewing of the platform about one or both pivotal axes, or in response to some types of external force, the platform will tend to oscillate about a desired heading. Electrical filtering of the output signal is usually employed to minimize the effects of such oscillation. The amount of filtering employed is a compromise between that sufficient to remove the effects of spurious oscillations but not so much as to degrade the slew performance of the compass. By maximizing the resonant frequency of the gimballed structure, it is possible to reduce the amount of filtering necessary and to reduce the lag in response to desired inputs and thereby improve the overall compass response.

In the present invention, the gimballed platform 14 includes the flux gates 10 and 12 and a small electronic package 19 to minimize the size and weight of the gimballed structure. In addition, conductive bearings 16 can be employed for coupling electrical signals in and out of the gimballed platform to eliminate the necessity of any interconnecting wires to the platform. Thus, power and control signals to the gimballed platform and data signals from the gimballed platform can be conveyed via the conductive bearings. The use of such conductive bearings also provides for a 360° pitch/roll capability without necessity for slip rings. The flux gates 10 and 12 are multiplexed via a single pair of wires to associated electronic circuitry, and such circuitry is preferably located separate from the gimballed platform to reduce the size and weight of the platform.

Figure 2:
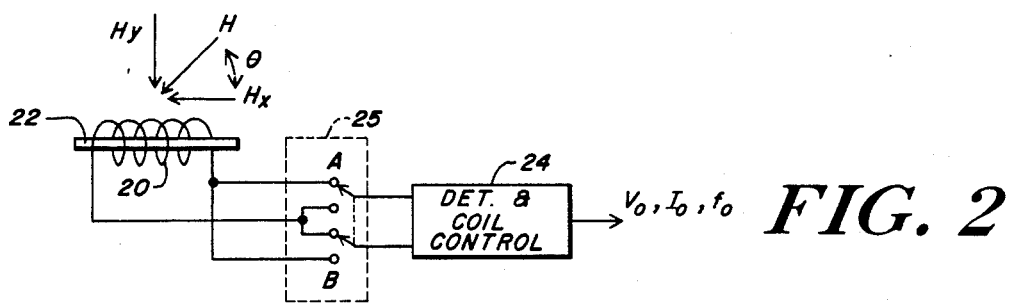
FIG. 2 is a block diagram of the solid state compass system.

Operation of a flux gate is illustrated in FIG. 2. A multiplexing switch 25 couples a detector and coil control circuit 24 to the flux gate coil 20. The switch 25 preferably is a solid state switch actuated by signals from circuit 24 to permit energization of coil 20 in either of two senses. The operation of the switch is equivalent to changing the direction of the coil turns from clockwise to counter-clockwise, or flipping the coil 180° in orientation. An energizing current from a suitable source is applied to the coil 20 by way of the switch 25. The circuit 24 is operative to derive signals from the flux gate which are proportional to the magnetic component $H_x$ which is the component of the H field along the axis of the coil. The output signal can be of voltage ($V_o$), current ($I_o$), or frequency ($f_o$) depending upon the particular circuit implementation employed. The output signal will be of the form $K \cos \theta + C_2$, or $K \sin \theta + C_1$ depending on which of the orthogonal coils is connected to the detector circuit. With the switch 25 in position A, the output signal from circuit 24 will be of one sense, while the output signal will be of opposite sense when switch 25 is in position B. Thus, for switch position A the output signal is proportional to $K \cos \theta + C_2$ (or $K \sin \theta + C_1$), while for switch position B the output signal will be of the form $-[K \cos \theta + C_2]$ (or $-[K \sin \theta + C_1]$). The value of the voltage, current, or frequency obtained with the switch in position B is subtracted from the value obtained with the switch in position A to result in an output in which the constant (C) terms cancel and in which the resulting output is proportional to $2 H_x$. The switch 25 is operated at a rate sufficient to provide a constant C which is stable within the period of measurement to provide for effective cancellation of the constant term. Each of the two flux gate coils is similarly energized to derive output signals therefrom. The heading angle $\theta$ is calculated as the arctangent of the ratio of the measurements for the two flux gate coils, taking into account quadrant corrections.

Figure 3:
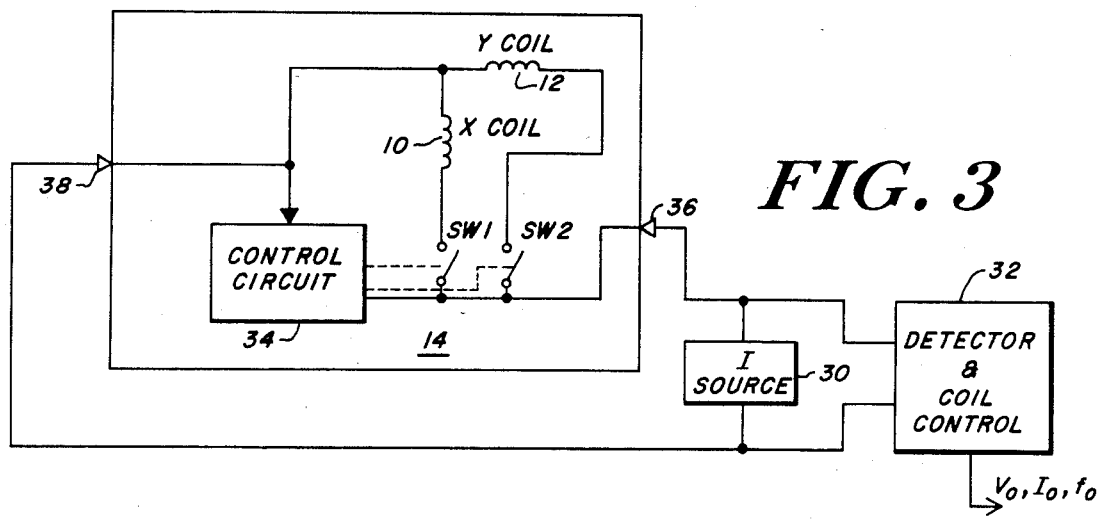
FIG. 3 is a schematic diagram illustrating the manner of flux gate excitation.

The electronic system with which the pair of flux gates is employed is shown in FIG. 3. The flux gates 10 and 12 are coupled by way of switches SW1 and SW2 to a current source 30 and to a detector and coil control circuit 32. A control circuit 34 controls the operation of the switches SW1 and SW2 which, in actual embodiment, are electronically actuated solid switches. The current source 30 and circuit 32 are connected to the gimballed platform 14 by a pair of wires and respective conductive bearings 36 and 38. Power and signals are applied to the flux gates and to control circuit 34 by only two wires, and signals are derived from the flux gates by the same two wires. The output signal provided by circuit 32 is a measure of the heading, and can be a voltage $V_o$, current $I_o$, or frequency $f_o$.

Various detection techniques can be employed for sensing heading and providing a signal representing that heading. One known detection technique is the null-balance technique in which an alternating current is employed to excite each flux gate coil and a DC feedback current provided to each coil of a magnitude which counters the earth's magnetic field and from which the heading is derived.

Detection can also be provided by a frequency technique as follows. A current change is provided through each flux gate coil, and the timing during which the current occurs is measured. Frequency can alternatively be measured in place of the time interval, as frequency and time are reciprocally related. If the current change is between two known voltage levels, the change in current is a constant, and the time $\Delta T$ can be expressed as $\Delta T = kL$, where k is a constant and L is the inductance of the coil. Thus, the time or frequency measurement is a direct function of the inductance, which, in turn, is a sinusoidal function of the orientation of the coil in relation to the earth's field when the coil is operated in a nonlinear portion of its B-H loop. A ratio of the time or frequency measurements for the two flux gates is provided, and a computation of the arctangent of the ratio provides a measure of the heading of the flux gate sensor in relation to the earth's field.

Figure 4:
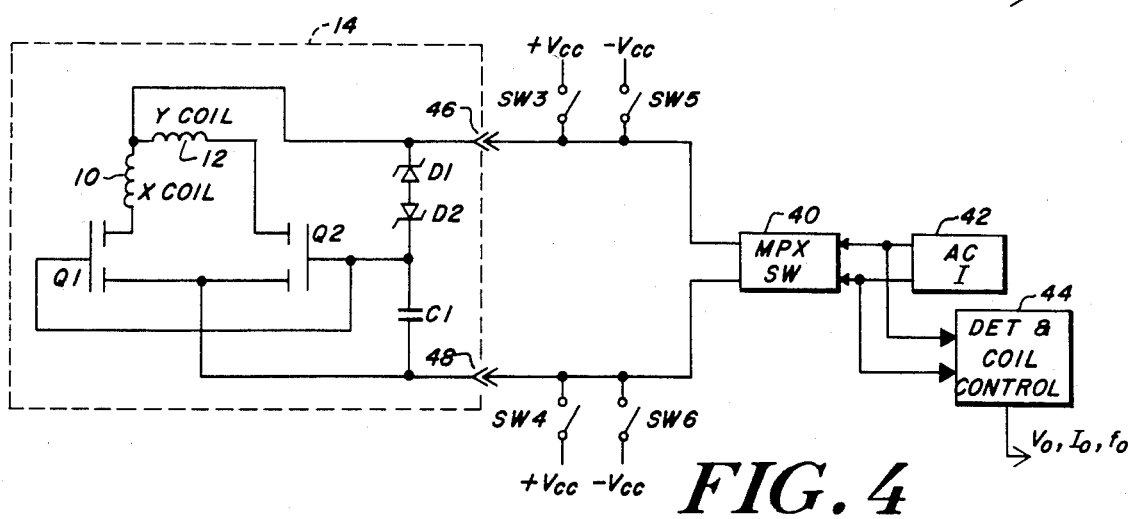
FIG. 4 is a schematic diagram of the system of FIG. 2.

An implementation of the system of FIG. 3 is shown in FIG. 4 in which the flux gates 10 and 12 are connected via respective FET switches Q1 and Q2 and a multiplex switch 40 to an AC current source 42 and to a detector and coil control 44. A positive voltage source $+V_{cc}$ and negative voltage source $-V_{cc}$ are selectively connected via switches SW3 and SW5 to a first input terminal 46, and via switches SW4 and SW6 to a second input terminal 48. A pair of oppositely poled Zener diodes D1 and D2 are connected in series with a capacitor C1 across the input terminals 46 and 48, with the junction between the capacitor C1 and Zener diode D2 being connected to the base terminals of the FET switches Q1 and Q2. The coil control section of circuit 44 provides control signals to switches SW3, SW4, SW5, SW6, and to multiplex switch 40.

Figure 5:
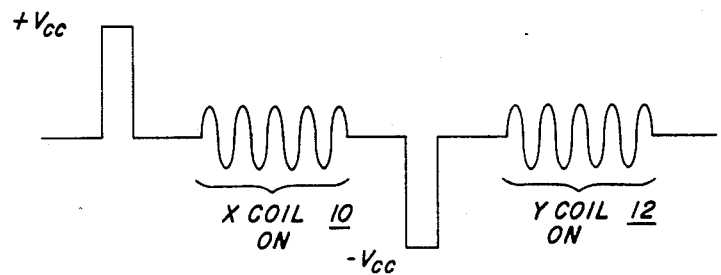
FIG. 5 is a signal diagram useful in explaining the operation of the circuit of FIG. 4.

With switches SW3 and SW4 closed, the positive voltage causes switch Q1 to conduct to permit application of a current from source 42 to coil 10 via the multiplex switch 40. With switches SW5 and SW6 closed, the negative voltage causes switch Q2 to conduct to permit application of current from source 42 to coil 12 via the multiplex switch 40. Thus, the coils 10 and 12 are respectively selected by the switches Q1 and Q2 in response to the alternate aplication of the supply voltages $+V_{cc}$ and $-V_{cc}$, as depicted in FIG. 5. Each flux gate coil 10 and 12 is sequentially energized by current applied from source 42 in a first sense and in an opposite sense, as discussed above with respect to FIG. 2, to produce an output signal proportional to the component of the earth's field along the coil axis. The output signal is free of error components which were cancelled automatically by the sequential energization of each flux gate according to the invention.

As discussed, the output signal can be in the form of a voltage, a current, or a frequency (or time) signal in accordance with the particular implementation employed. The detection and processing of the signals from the flux gates is accomplished in similar manner irrespective of the nature of the particular signals utilized in a particular embodiment. The signal processing is as described below with the following nomenclature employed. The term $V_x$ refers to a signal of one polarity derived from the X coil, and the term $V_{\bar{x}}$ is the signal of opposite polarity derived from the X coil. The terms $V_y$ and $V_{\bar{y}}$ refer to the signals derived from the Y coil of one polarity and of opposite polarity, respectively. The signals $V_x$ and $V_{\bar{x}}$ of the X coil for each cycle of an operating sequence are read. Similarly, the signals $V_y$ and $V_{\bar{y}}$ of the Y coil are read for each cycle of the operating sequence. An average of each of the signals is provided, the average value of $V_{\bar{x}}$ is subtracted from the average value of $V_x$, and the average value of $V_{\bar{y}}$ is substracted from the average value of $V_y$. The ratio of the resultants of the subtraction operations is taken, and a computation is made of the arctangent of the value resulting from the ratio computation. This arctangent computation provides the compass heading $\theta$. Quadrant corrections are applied to eliminate quadrant ambiguity. The output signal which represents compass heading can be applied to a display for visual indication of heading, or can be applied to a memory for storage of heading, or otherwise employed. The output signal can also be translated into an appropriate format to suit particular signal processing requirements.

Figure 6:
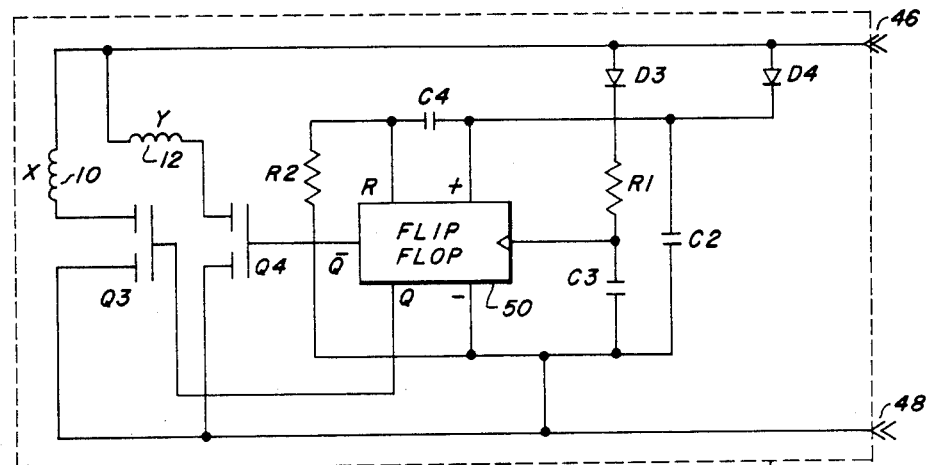
FIG. 6 is a schematic diagram of an alternate embodiment of the system.

An alternative implementation is shown in FIG. 6 in which the flux gates 10 and 12 are respectively energized by means of FET switches Q3 and Q4 and a flip-flop 50. A rectifier D4 provides DC power to the flip-flop and switches Q3 and Q4 in response to AC power applied by way of input terminals 46 and 48. The capacitor C2 is a filter capacitor for the rectifier. A series network composed of a diode D3, resistor R1, and capacitor C3 is connected as shown, and clock pulses are derived from the junction between resistor R1 and capacitor C3, these clock pulses being applied to the clock input of the flip-flop. Reset pulses for the flip-flop are derived from the junction of capacitor C4 and resistor R2. The outputs of the flip-flop are respectively connected to the FET switches Q3 and Q4.

The circuit of FIG. 6 is also operative to alternately energize the flux gate coils 10 and 12. In response to clock pulses applied to the flip-flop 50, the flip-flop alternately actuates switches Q3 and Q4 for respective selection of the flux gate coils 10 and 12. Each flux gate coil is alternately energized with current of one sense and opposite sense, as described above. Clock pulses for the flip-flop 50 are provided by any appropriate means which can be included within the coil control circuit 44. After each cycle of operation, a reset pulse is applied to the flip-flop 50 to initialize and system for a subsequent cycle of operation.

Figure 7:
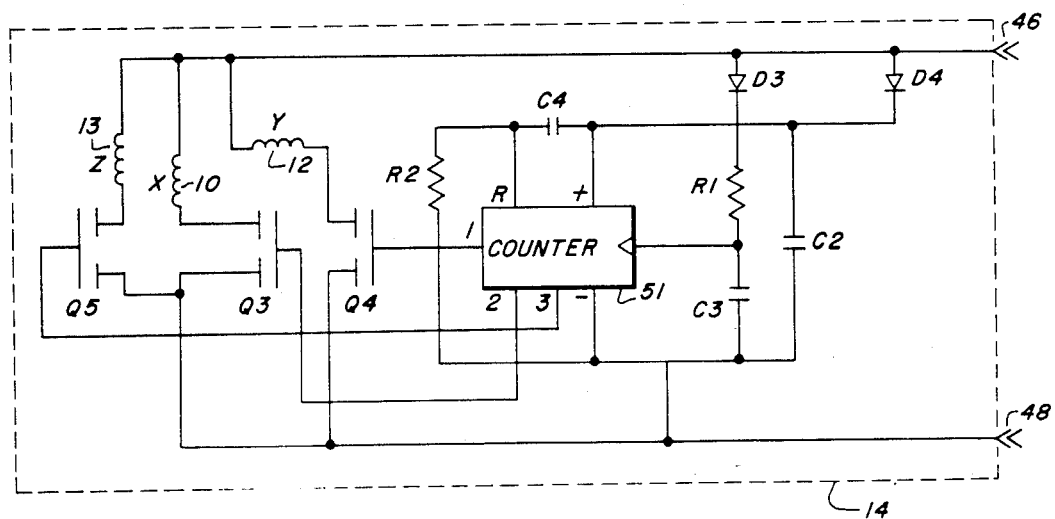
FIG. 7 is a schematic diagram of a further embodiment employed with three flux gates.

A further embodiment is shown in FIG. 7 in which three flux gate coils are provided, each along a respective orthogonal axis. The circuit of FIG. 7 is similar to the circuit of FIG. 6 with the addition of a Z coil 13 which is disposed along an axis mutually orthogonal to the axes of coils 10 and 12. A counter 51 is coupled to FET switches Q3, Q4, and Q5 which are respectively connected to flux gate coils 10, 12, and 13. In response to clock pulses applied to counter 51, counter output signals are respectively applied to the switches Q3, Q4, and Q5 for sequential actuation thereof, thereby to sequentially select the flux gate coils. Each selected flux gate coil is energized in the manner described above to provide an output signal representative of heading. The embodiment of FIG. 7 employing three mutually orthogonal flux gates provides a three axis magnetometer system which is operable over only two wires.

The invention is not to be limited by what has been particularly shown and described except as indicated in the appended claims.

What is claimed is:

1. A solid state magnetic compass comprising:
   a movable platform having a plurality of flux gates in mutually orthogonal disposition;
   means for movably suspending the platform in a substantially horizontal orientation;
   means for energizing each flux gate only one at a time; and
   means for detecting signals from each flux gate representative of compass orientation.

2. The magnetic compass of claim 1 wherein the platform includes a pair of conductive bearings and means for providing control signals and power to the flux gates through said conductive bearings and means for providing flux gate signals to external circuitry through said conductive bearings.

3. The magnetic compass of claim 2 wherein the control signals and power are applied over a single two-wire path.

4. The magnetic compass of claim 1 wherein each flux gate is energized sequentially with a pulse signal of one polarity and a pulse signal of opposite polarity in a cyclic manner.

5. The magnetic compass of claim 4 wherein the platform includes three flux gates supported on the platform and in mutually orthogonal disposition.

6. The magnetic compass of claim 1 wherein the platform includes a first flux gate and a second flux gate supported on the platform and in orthogonal disposition to one another.

7. The magnetic compass of claim 6 wherein each of the flux gates includes a cylindrical coil having an opening therethrough in which is disposed a saturable magnetic core.

8. The magnetic compass of claim 7 wherein each of the flux gates are arranged at 45° relative to the pivot axis of the platform.

9. The magnetic compass of claim 7 wherein said means for sequentially energizing each flux gate includes means for applying a signal of one polarity to the flux coil and means for applying a signal of opposite polarity to the flux gate coil.

10. A solid state magnetic compass comprising:
    a pair of flux gates supported in mutually orthogonal disposition;
    means for movably suspending the orthogonal pair of flux gates in a plane of substantially horizontal orientation;
    means for energizing each flux gate sequentially with a signal of cyclically reversing polarity; and
    means for detecting signals from each flux gate from which compass orientation can be derived.

11. A solid state magnetic compass comprising:
    a support having first and second flux gates in mutually orthogonal disposition;

circuit means retained on said support for sequentially energizing each flux gate one at a time;

means for movably suspending the support in a substantially horizontal orientation;

means external to said support for providing signals to the circuit means and to the flux gates wherein said circuit means includes means for sequentially energizing each flux gate; and means external to said support for providing a compass orientation according to sequential signals received from each flux gate.

12. The magnetic compass of claim 11 wherein the circuit means includes switch means for selective connection to each of the flux gates according to a control signal; and a control circuit operative for providing said control signal to control operation of the switch means.

13. The magnetic compass of claim 12 wherein the switch means comprise solid state switches and wherein the control circuit comprises a gate circuit operative to alternately actuate the solid state switches.

* * * * *

UNITED STATES PATENT AND TRADEMARK OFFICE
CERTIFICATE OF CORRECTION

PATENT NO. : 4,503,621
DATED : March 12, 1985
INVENTOR(S) : John T. Fowler

It is certified that error appears in the above—identified patent and that said Letters Patent is hereby corrected as shown below:

| | | |
|---|---|---|
| Column 2, | line 44 | "such permalloy." should read --such as permalloy.-- |
| | line 59 | "light weight" should read --lightweight-- |
| Column 4, | line 1 | "solid switches." should read --solid state switches.-- |
| | line 20 | "timing" should read --time-- |
| | line 21 | "current occurs" should read --current change occurs-- |
| Column 5, | line 22 | "substracted" should read --subtracted-- |
| | line 59 | "initialize and" should read --initialize the-- |

Signed and Sealed this

Fourth Day of March 1986

[SEAL]

Attest:

DONALD J. QUIGG

Attesting Officer

Commissioner of Patents and Trademarks